(12) United States Patent
Kim (10) Patent No.: US 8,400,650 B2
(45) Date of Patent: Mar. 19, 2013

(54) NETWORK PRINTER AND NETWORK PRINTING METHOD OF RESTRICTING HOST FROM USING NETWORK PRINTER

(75) Inventor: Jin-hyung Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 915 days.

(21) Appl. No.: 11/685,935

(22) Filed: Mar. 14, 2007

(65) Prior Publication Data

US 2008/0049246 A1    Feb. 28, 2008

(30) Foreign Application Priority Data

Aug. 24, 2006    (KR) .............................. 2006-0080271

(51) Int. Cl.
*G06K 15/00* (2006.01)

(52) U.S. Cl. ..................... 358/1.14; 358/1.13; 358/1.15; 709/225; 713/182

(58) Field of Classification Search ................. 358/1.13, 358/1.14, 1.15; 709/225; 713/182
See application file for complete search history.

(56) References Cited

U.S. PATENT DOCUMENTS

| | | | |
|---|---|---|---|
| 2004/0263896 A1* | 12/2004 | Nagata et al. | 358/1.14 |
| 2005/0134890 A1* | 6/2005 | Woo | 358/1.13 |
| 2006/0173670 A1* | 8/2006 | Engel et al. | 703/26 |
| 2006/0195596 A1* | 8/2006 | Kawai | 709/229 |
| 2006/0288116 A1* | 12/2006 | Seki et al. | 709/232 |
| 2007/0008942 A1* | 1/2007 | Ocepek et al. | 370/338 |
| 2008/0068642 A1* | 3/2008 | Takahashi | 358/1.15 |

FOREIGN PATENT DOCUMENTS

| | | |
|---|---|---|
| JP | 2004-280256 | 10/2004 |
| JP | 2004-361866 | 12/2004 |

OTHER PUBLICATIONS

Korean Office Action dated Aug. 23, 2012 issued in KR Application No. 10-2006-0080271.

* cited by examiner

*Primary Examiner* — Jacky X Zheng (74) *Attorney, Agent, or Firm* — Stanzione & Kim, LLP (57) ABSTRACT

A network printer and a network printing method of restricting a host from using the network printer. The network printing method includes, if identification information of a host and a print job request signal are received from the host, receiving print data from the host and processing the received print data into a printable signal, determining whether an error exists in a print job during the processing of the print data into the printable signal, if the error exists, automatically registering the identification information of the host in a use restriction list to prevent execution of the print job, and if no error exists in the print job, executing the print job with respect to the print data.

11 Claims, 5 Drawing Sheets

| | | | |
|---|---|---|---|
| Home | Information | Network Setting | Device Setting |

| Network Setting | >IP Filtering>> ☑ enable | | | |
|---|---|---|---|---|
| General | No | Host Name | IP Address | Reason for Registration |
| Enter Talk | 1 | First Host | 10.88.195.93 | Check Sum Error |
| TCP/IP | 2 | Second Host | 10.88.193.86 | No Supported Emulation |
| SNMP | 3 | Sixth Host | 168.219.15.22 | Time Out |
| IP Filtering | 4 | – | 0.0.0.0 | – |
| MAC Filtering | ⋮ | ⋮ | ⋮ | ⋮ |
| Reset | | | | |
| | n | – | 0.0.0.0 | – |

FIG. 5

Automatic Use Restriction Setting Conditions

☑ Check Sum Error

☑ Not Supported Emulation

⋮ ⋮

☐ Time Out

FIG. 6

NETWORK PRINTER AND NETWORK PRINTING METHOD OF RESTRICTING HOST FROM USING NETWORK PRINTER

CROSS-REFERENCE TO RELATED APPLICATIONS

This application claims priority under 35 U.S.C. §119 of Korean Patent Application No. 2006-80271, filed Aug. 24, 2006, in the Korean Intellectual Property Office, the disclosure of which is incorporated herein by reference, in its entirety.

BACKGROUND OF THE INVENTION

1. Field of the Invention

The present general inventive concept relates to a network printer and a network printing method to restrict a host from using the network printer. More particularly, the present general inventive concept relates to a network printer and a network printing method to restrict a host from using the network printer, which can eliminate waste of resources due to misprinting by automatically filtering and registering identification information of a host and by not executing a print job if an error is detected from print data transmitted from the host.

2. Description of the Related Art

A network printing system is a system in which plural hosts share plural printable devices through a wire/wireless network. In the network printing system, a host requests a print job to a device selected among the plurality of devices existing in the corresponding network by transmitting print data to the selected device.

In such a network printing system, even if print data in which an error has occurred is transmitted from a host, a conventional printing device receives the print data having the error and executes an erroneous print job. In particular, even if the same host repeatedly transmits the print data with the error therein, the conventional printing device cannot restrict the execution of the print job and, therefore, repeatedly executes the erroneous print job, resulting in waste of resources including printing paper, toner, and power, for example.

On the other hand, in the network printing system, the conventional printing device may be provided with a function to restrict the host from using the printing device in order to provide security or to stop waste of resources. That is, a user or a manager can register the address of the host in a respective printing device, and can restrict the host from using the printing device. Specifically, the user or manager can register the address of the host that may be repeatedly transmitting print data in which an error has occurred, and thus, the printing device is restricted from executing the print job containing an error in the print data transmitted from the registered host.

In this case, however, the user or manager has to manually register the address of the host in which an error has occurred thereby to cause inconvenience to the user or the manager. Also, the conventional printable device continues to execute the error containing print job until the user or manager recognizes an error.

SUMMARY OF THE INVENTION

The present general inventive concept provides a network printer and a network printing method to restrict a host from using the network printer, which can eliminate user's inconvenience due to the manual setting of a host's authority to use a printer and to prevent waste of resources due to a print error in the print data.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a network printing method of restricting a host from using a network printer, the method including if identification information of a host and a print job request signal are received from the host, receiving print data from the host and processing the received print data into a printable signal, determining whether an error exists in a print job during the processing of the print data into the printable signal, and if the error exists, automatically registering the identification information of the host in a use restriction list, and if no error exists in the print job, executing the print job with respect to the print data.

The network printing method may further include, if the print job request signal is received, confirming whether the identification information of the host has been registered in the use restriction list, and if the identification information of the host has been registered, not accepting the print data from the host.

The network printing method may further include generating and transmitting a print rejection message to the host if the identification information of the host has been registered or is automatically registered in the use restriction list.

The network printing method may further include reporting the result of registration to a manager if the identification information of the host has been registered in the use restriction list.

The criteria of determining whether the error exists can be set and changed through a user interface.

The host identification information may be any one of an IP (Internet Protocol) address and a MAC (Media Access Control) address of the host.

The foregoing and other aspect of the present general inventive concept may also be achieved by providing a network printer to restrict a host from using the network printer, the network printer including a device communication unit to receive identification information of a host, a print job request signal, and print data from a host, an image processing unit to process the received print data into a printable signal and to determine whether an error exists in a print job during processing of the print data into the printable signal, a storage unit to register the received identification information of the host in a use restriction list, and a control unit to control the storage unit to automatically store the identification information of the host if it is determined that the error exists.

The control unit may confirm whether the identification information of the host has been registered in the use restriction list if the print job request signal is received, and to control the device communication unit not to receive the print data from the host if the identification information of the host has been registered in the use restriction list.

The control unit may control the device communication unit to generate and transmit a print rejection message to the host if the identification information of the host has been registered or is automatically registered in the use restriction list.

The control unit may control the device communication unit to report the result of registration to a manager if the identification information of the host has been registered in the use restriction list.

The foregoing and/or other aspects and utilities of the present general inventive concept may also be achieved by providing a network printer including an image processing unit to process print data to be printed in a printing mode, and a control unit to control the image processing unit not to process the print data according to an error signal in the printing mode.

The control unit can control the image processing unit to be in a standby mode to process another print data to be printed in another printing mode.

The error signal can be a check sum condition error, a time out condition error or an unsupported emulation condition error, or the like.

The printer can further include a device communication unit to communicate with an external host from which the print data is received, where the control unit can control the device communication unit not to receive the same print data from the external host according to the error signal.

The printer can further include a print engine unit to print the processed print data, so that the control unit can control the print engine unit not to print the processed print data according to the error signal.

The printer can further include a storage unit to store information on an external host from which the print data is received when the error signal corresponds to the external host.

The foregoing and/or other aspects and utilities of the present general inventive concept may also be achieved by providing a network printer including a device communication unit to communicate with an external host to receive print data and information on the external host, and a control unit to control the device communication unit not to receive the print data from the external host according to an error signal corresponding to the printing mode to print the print data.

The control unit can prevent the device communication unit from receiving print data from the external host.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
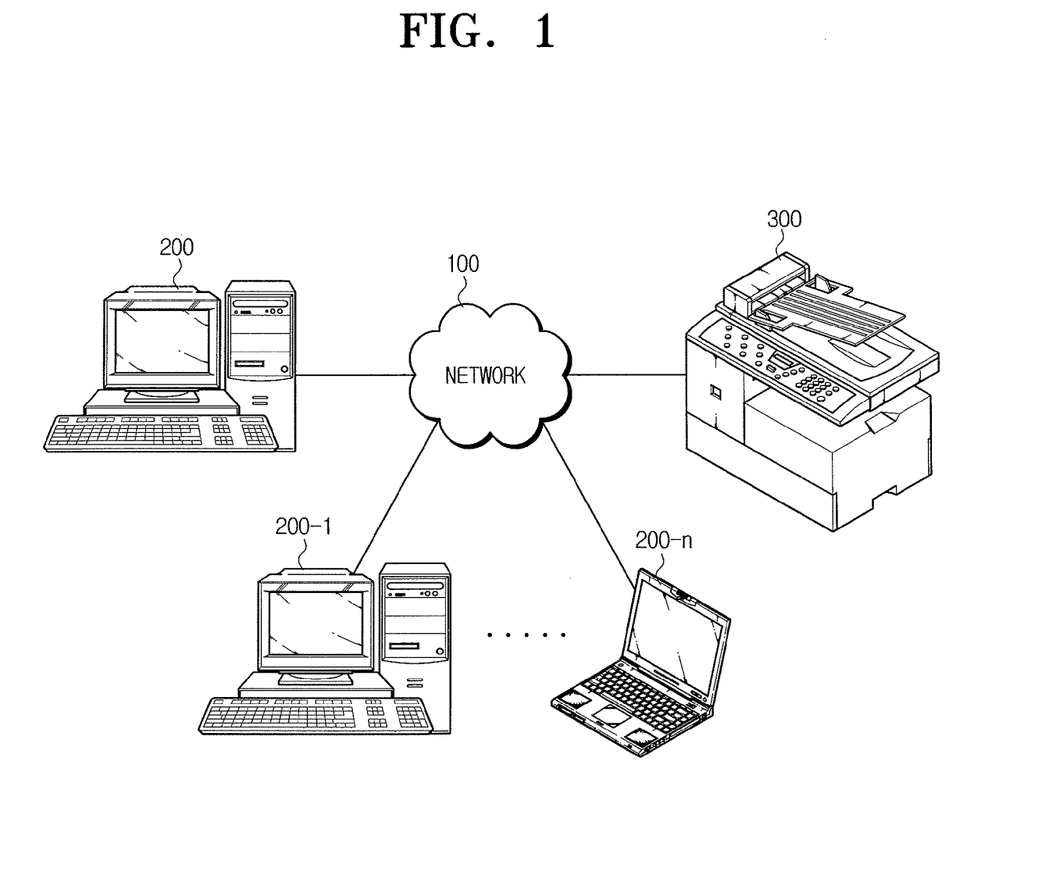
FIG. 1 is a view schematically illustrating a network printing system to which a network printer to restrict a host from using the network printer is provided according to an embodiment of the present general inventive concept.

FIG. 1 is a view schematically illustrating a network printing system to which a network printer 300 to restrict a host 200 (200-1, . . . 200-n) from using the network printer is provided according to an embodiment of the present general inventive concept.

Referring to FIG. 1, the network printer 300 is connected to first to n-th hosts 200, 200-1, . . . , and 200-n (here, n is a positive number) through a network 100. In this embodiment of the present general inventive concept, one network printer 300 is illustrated. However, two or more network printers may be connected to the network 100. The network printer may be an image forming apparatus to perform a printing mode to receive data and print the received data. The image forming apparatus may be in the printing mode or a standby mode to be ready to receive data.

The network printer 300, which is a device having a function of printing an image on a paper (or other suitable medium), prints print data transmitted from the first to n-th hosts 200, 200-1, . . . , and 200-n. The network printer 300 may be a printer, a facsimile machine, or a multifunctional device (or other suitable device).

The first to n-th hosts 200, 200-1, . . . , and 200-n may be used to request print jobs by transmitting the print data to the network printer 300 connected via the corresponding network 100. The host may be a terminal such as a personal computer (PC) or a notebook computer.

The network 100 supports wire/wireless networking, and can be constructed by cables connected to general parallel parts, cables connected to USB (Universal Serial Bus) ports, the Internet through hubs and LAN, and/or wireless connections such as may be used to implement Bluetooth.

If a print job in which an error has occurred is requested from one or more of the first to n-th hosts 200, 200-1, . . . , and 200-n, the network printer 300 as described above may be used to automatically filter and/or register the identification information of the host that has requested the print job containing the print error, and then may be used to automatically intercept the print job requested from that same registered host. Accordingly, the network printer 300 can be used to prevent waste of resources, such as paper and toner, otherwise caused by the error (e.g., print error).

The error may be an unsupported emulation condition error (e.g., emulator cannot emulate print data), a time out condition error (e.g., too much time elapsed before completion of print data reception completed), a check sum condition error (e.g., image processing unit cannot execute the image process due to erroneously computed print data), or the like.

The network printer 300 may be changed from the printing mode to the standby mode after rejecting the print job, canceling the print job, or preventing performing of the print job according to the error.

Figure 2:
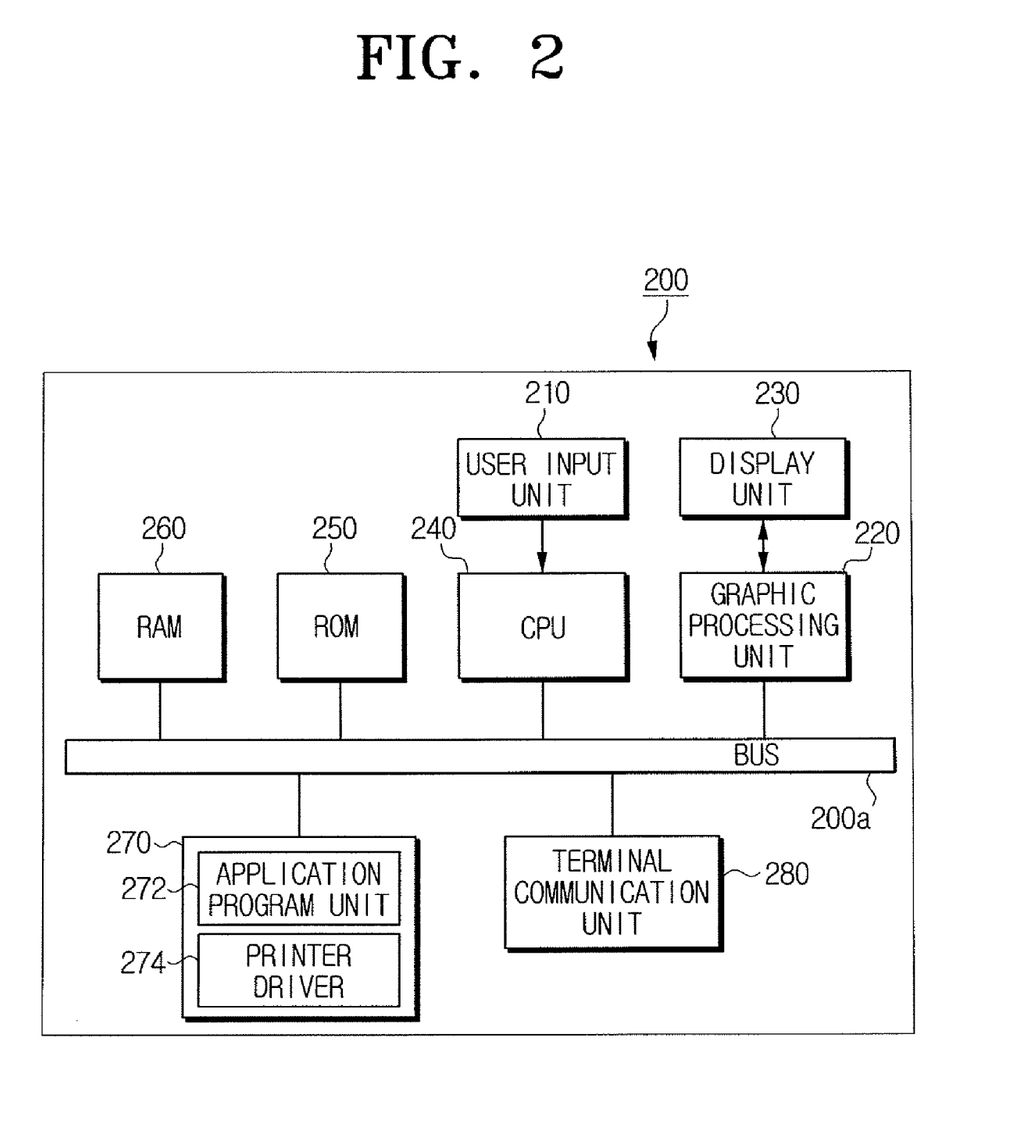
FIG. 2 is a block diagram illustrating the detailed construction of the first host among the first to n-th hosts as illustrated in FIG. 1.

FIG. 2 is a block diagram illustrating the detailed construction of the first host among the first to n-th hosts as illustrated in FIG. 1, according to an embodiment of the present general inventive concept.

Referring to FIGS. 1 and 2, the first host 200 may include a user input unit 210, a graphic processing unit 220, a display unit 230, a CPU (Central Processing Unit) 240, a ROM 250, a RAM 260, an HDD 270, and a terminal communication unit 280. A bus 200a may be used to support data movement paths among the above-described components. Since the hosts 200-1, ..., and 200-n, which are not illustrated in FIG. 2, are equal or similar to the first host 200, their detailed explanation and illustration thereof will be omitted. However, the description of host 200 may be applied to hosts 200-1 ... 200-n.

The user input unit 210 may be used to request functions supported by the host 200, and may be provided with a keyboard, a mouse, and so forth (not illustrated). Particularly, the user input unit 210 may be used to enable a user to prepare a document through an application program or to request the printing of the prepared document.

The graphic processing unit 220 may be used to process a general video signal into a displayable signal and to output the processed signal to the display unit 230. The display unit 230 may include a monitor (not illustrated) to display the signal that may be outputted from the graphic processing unit 220. The display unit 230 may also be used to display the current operational state of the host 200, and the display may be implemented by a CRT (Cathode Ray Tube), an LCD (Liquid Crystal display), and so forth (not illustrated).

The CPU 240 may be used to manage the entire operation of the host 200 by using various kinds of control programs and/or an OS (Operating System).

The ROM 250 is a nonvolatile memory device that may be used to store various kinds of control programs required to implement the functions of the host 200. The RAM 260 is a volatile memory device that may be used to store programs loaded from the ROM 250 to be executed by the CPU 240, or data processed by the CPU 240.

The HDD (Hard Disk Drive) is a mass storage medium that may be used to store a large number of application programs and/or driver programs. Particularly, in order to request the print job to the network printer 300, the HDD 270 may include an application program unit 272 and a printer driver 274.

In the application program unit 272, application programs, to enable a user to prepare various kinds of documents, may be stored or appropriately linked. In the case of printing a document prepared through the application program unit 272, for example, the application program unit 272 may be used to provide a print request signal, a print option, and/or print data of the document to be printed, to the printer driver 274. The print option refers to diverse printing parameters such as the size of a printing paper (or other suitable medium), the number of copies, the direction of printing, and so forth.

The printer driver 274 may be used to provide a user interface to set the printing parameters supported by the network printer 300. Also, the printer driver 274 may be used to convert the set printing parameters and print data into a printer language that can be emulated by the network printer 300. Also, the printer language may be selected by the user through the user interface.

For example, the printer language may be PCL (Printer Control Language) proposed by Hewlett Packard, PostScript (PS) proposed by ADOBE, and GDI (Graphics Device Interface) language to convert a page of print data into bitmap data. SPL (Samsung Printer Language) supported by Samsung may be an example of the GDI language.

The terminal communication unit 280 may be used to facilitate data communications with the network printer 300 through the network 100. For example, the terminal communication unit 280 may be used to transmit the print job request signal, printing parameters, print data converted into the printer language, IP (Internet Protocol) address or MAC (Media Access Control) address to be described later, and so forth, to the network printer 300. For this, the terminal communication unit 280 may use a LAN card such as a network interface card (NIC) (not illustrated). In the case where the terminal communication unit 110 is implemented by a LAN card, the LAN card may be provided with an inherent MAC address allocated during the manufacturing of the LAN card. This MAC address may be used as the identification information of the first host 200.

Figure 3:
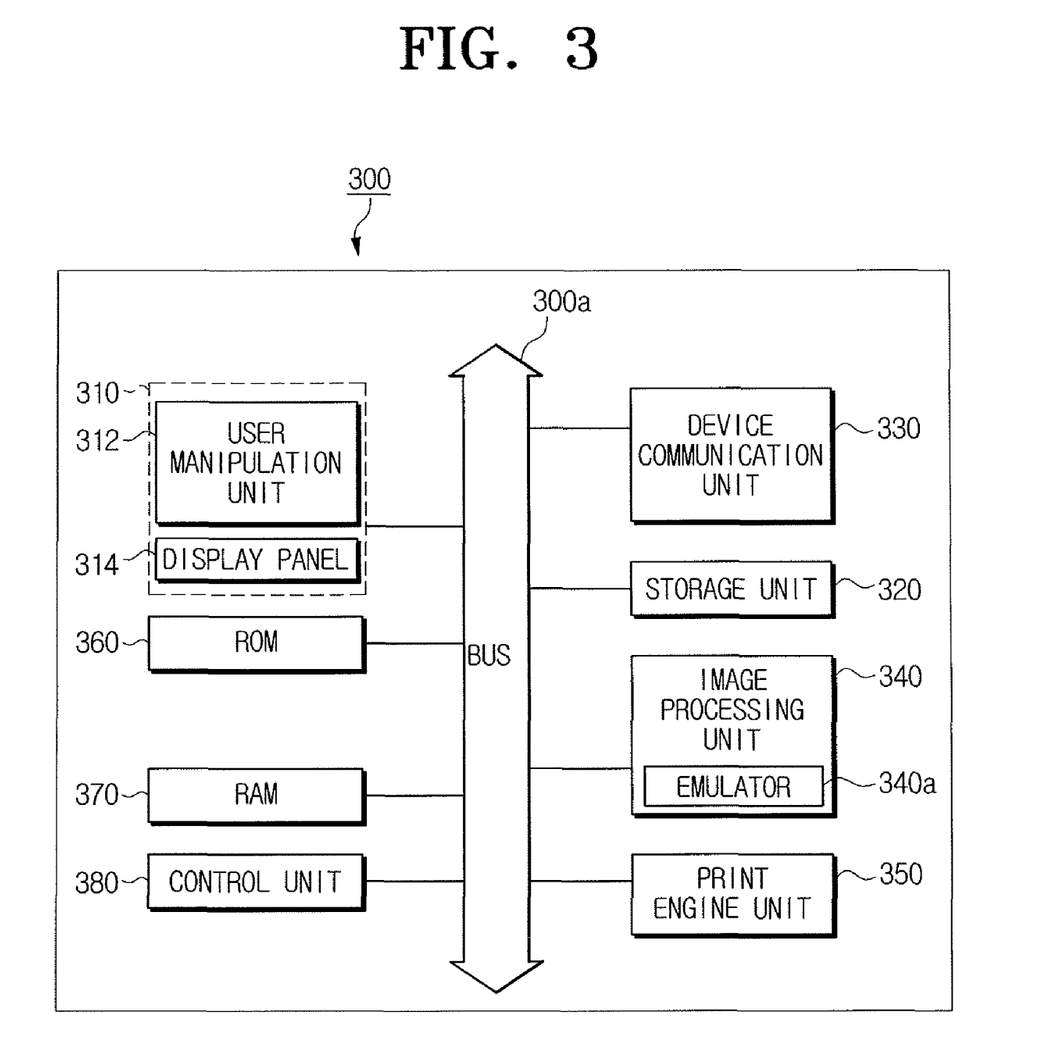
FIG. 3 is a block diagram schematically illustrating the construction of the network printer as illustrated in FIG. 1.

FIG. 3 is a block diagram schematically illustrating the construction of a network printer as illustrated in FIG. 1, according to an embodiment of the present general inventive concept.

Referring to FIGS. 1 to 3, the network printer 300 may include an operation panel unit 310, a storage unit 320, a device communication unit 330, an image processing unit 340, a print engine unit 350, a ROM 360, a RAM 370, and a control unit 380. A bus 300a may be used to support data movement paths among the above-described components, as illustrated.

The operation panel unit 310 can include a user manipulation unit 312 and a display panel 314. The user manipulation unit 312 is a user interface that may be used to output signals to the control unit 380 to manipulate functions supported by the network printer 300 to be described later. For this, the user manipulation unit 312 can include various kinds of function keys (not illustrated) and a touch screen (not illustrated) to input characters, numerals, and directions.

The display panel 314 may be used to display the current operational state of the network printer 300 by using, for example, characters, symbols, and images, and may be under the control of the control unit 380. The display panel 314 may also be used to display an error report message, and/or an error rejection message generated by the image processing unit 340 to be described later. The display panel may also be used in conjunction with a GUI (Graphic User Interface) to set use restriction conditions for the first to n-th hosts 200, 200-1, ..., and 200-n, and so forth, for example. The display panel 314 may be implemented by an LCD (not illustrated).

The storage unit 320 is a nonvolatile memory such as a flash ROM which may be used to store a use restriction list to restrict the first to n-th hosts 200, 200-1, ..., and 200-n from using the network printer 300. That is, the use restriction list of the storage unit 320 may contain identification information of the hosts which may have been automatically or manually restricted from using the network printer optionally including the reason for the use restriction. The identification information may be IP addresses or MAC addresses of the respective hosts 200, 200-1, ..., and 200-n, for example.

The device communication unit 330 is a communication module that may be used to transmit and/or to receive information, signals, data, etc. to and/or from the first to n-th hosts 200, 200-1, ..., and 200-n, via the network 100. In particular, the device communication unit 330 may be used to receive the identification information, print job request signal, printing parameters, and/or print data transmitted from the first to n-th hosts 200, 200-1, ..., and 200-n, and to output the received signals to the control unit 380. Hereinafter, the first host 200 illustrated in FIG. 2 will be described, as an example.

The image processing unit 340 may be used to execute image processing of the print data received via the device communication unit 330 by using the printing parameters, for example. In particular, an emulator 340a of the image processing unit may be provided to emulate the received print data by using the set printer language.

For example, if the print data has been (or has to be) converted into a PCL form, the emulator 340a may be used to emulate the print data using the PCL. Also, in the case where the emulator 340a is used to emulate the print data using a printer language different from PCL which is not supported by the network printer 300, for example, the emulator 340a may be used to detect any error during the emulation of the print data, and to report the error detection to the control unit 380. Thus, the emulator 340a may be used to detect an error, for example, when a printer language different than a printer (or print driver) supported printer language may be used by the emulator 340a. In other words, an error may be detected when a mis-matched printer language may be used by the emulator 340a. In addition, in such case, for example, where the emulator 340a may be attempting to emulate a printer language other than a printer language supported by the corresponding network printer (or other suitable printing device), the emulator 340a may be used to terminate the emulation to prevent the erroneous print data from being printed. The emulator 340a may also be used to terminate the emulation of other kinds of print data errors that are detected according to one or more embodiments of the present general inventive concept The print engine unit 350 may be used to print the print data outputted from the image processing unit 340 on a printing paper (or other suitable medium) by using a print mechanism.

The ROM 360 may be used to store basic information to check respective elements of the network printer 300 before the network printer 300 executes the print job, and/or to store various kinds of control programs required to drive the network printer 300.

The RAM 370 may be used to store data processed by the control unit 380, diverse variable data, such as programs loaded from the ROM 360, and the identification information of the first host 200.

The control unit 380 may be used to control the entire operation of the network printer 300 by using the control programs that may be stored in the ROM 360. In particular, if the identification information of the first host 200 and the print job request signal are received from the first host 200, the control unit 380 may be used to confirm whether the network printer 300 has been restricted from using the network printer by using the identification information of the first host 200 (e.g., by comparing the identification information against the use restriction list). That is, the control unit 380 can be used to confirm whether the identification information of the first host 200 has been registered in the storage unit 320. If the identification information of the first host 200 has been registered, it indicates that the first host 200 has been restricted from using the network printer 300. Thus, the control unit 380 may be used to control the device communication unit 330 not to receive (or reject or not to use or not to accept) the print data from the first host 200.

By contrast, if the identification information of the first host 200 has not been registered in the storage unit 320, the control unit 380 may be used to determine that the host 200 is permitted to use the network printer 300, and thus, to control the device communication unit 330 to receive (or to use or to accept) the print data and data related to the print job such as printing parameters from the first host 200. If the data related to the print job is received through the device communication unit 330, the control unit 380 may be used to output the received print data and printing parameters to the image processing unit 340 and to control the image processing unit 340 to process the print data into a printable signal.

Here, if it is determined that an error has occurred in the requested print job, the control unit 380 may be used to automatically filter the identification information of the first host 200 and to optionally register the reason for the error occurrence, and to control the storage unit 320 to store the filtered identification information and optionally the reason the error occurred.

For example, the reason the error occurred may be "Not Supported Emulation" detected when the printer language supported by the emulator 340a cannot emulate the print data, "Check Sum Error" produced when the image processing unit 340 cannot execute the image process due to the erroneously computed print data transmitted from the first host 200, "Time Out Error" produced due to the time out generated before the completion of the print data reception through the device communication unit 330, and so forth. The reason the error occurred may be provided from the emulator 340a, image processing unit 340, or device communication unit 330, for example.

Thereafter, if the print job is requested again by the first host 200 registered in the use restriction list of the storage unit 320, the control unit 380 may be used to restrict the first host 200 from using the network printer 300 by filtering the identification information of the first host 200, and to control the device communication unit 330 not to receive (or reject or not to use or not to accept) the print data from the first host 200.

In addition, the control unit 380 may be used to control the image processing unit 340 to generate an event or a message to report that the first host 200 has been registered in the use restriction list, and to control the device communication unit 330 to transmit the generated event or message. More specifically, if a program related to a protocol to confirm the status of the network printer 300 has been installed in the first host 200, the control unit 380 may be used to generate a message to report that the first host 200 has been restricted from using the network printer 300, and to transmit the generated message to the first host 200.

In addition, the control unit 380 may be used to control the device communication unit 330 to transmit the message to a manager of the network printing system by email or short message. In this case, the device communication unit 330 can use a mobile terminal number or an email address of the manager that may be stored in a memory built therein (not illustrated). Accordingly, the manager or the user of the first host 200 can change the settings related to the printing of the first host 200 so as to reset the use authority of the first host 200 which has been restricted from using the network printer or to make the first host 200 to transmit the correct print data so that it may be correctly printed.

By contrast, if no error has occurred in the requested print job, the control unit 380 may be used to control the print engine unit 350 to print the image-processed print data.

As described above, the control unit 380 may be used to automatically detect whether an error has occurred on the print job, and if the error has occurred, the control unit 380 can automatically register the identification information of the host that has transmitted the print data containing the error on the use restriction list. As a result, the control unit 380 can be used to prevent execution of the print job if the error has occurred on the print data, and thus, prevent waste of resources related to the printing of print data containing the error.

Figure 4:
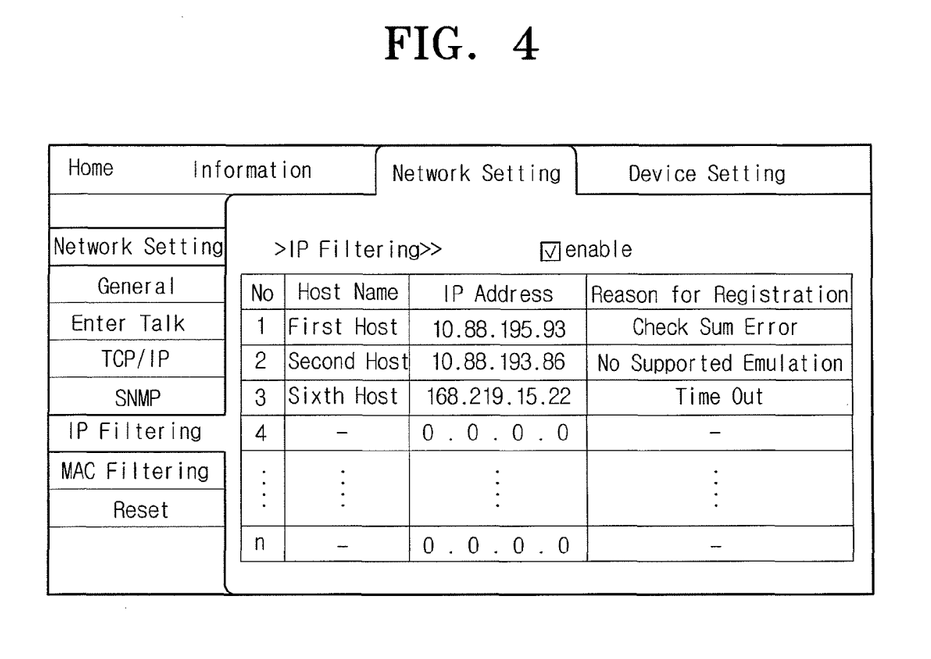
FIG. 4 is a view illustrating an example of a GUI that indicates identification information of a host registered in a use restriction list of a storage unit of FIG. 3 according to an embodiment of the present general inventive concept.

On the other hand, the identification information of the host registered in the use restriction list of the storage unit 320 can be confirmed through the GUI as illustrated in FIG. 4. Referring to FIG. 4, IP addresses can be used as automatically filtered identification information, and reasons to restrict the hosts from using the network printer can optionally be indicated. Referring to FIG. 4, the GUI illustrates, under a "Network Setting" tab, that ">IP Filtering>>" is enabled by the corresponding check mark listing the restricted hosts by their corresponding "No.", "Host Name", "IP address" and Reason for Registration." Thus, for example, No. "1" corresponds to a "First Host" having an IP address of "10.88.195.93" which is restricted from using a network printer 300 due to a "Check Sum Error," as illustrated. Similar information is provided for each restricted host (e.g., "Second Host", "Sixth Host", up to the "nth" host, as appropriate. Note that FIG. 4 is an illustration and other forms or modifications of the GUI of FIG. 4 may be used.

Figure 5:
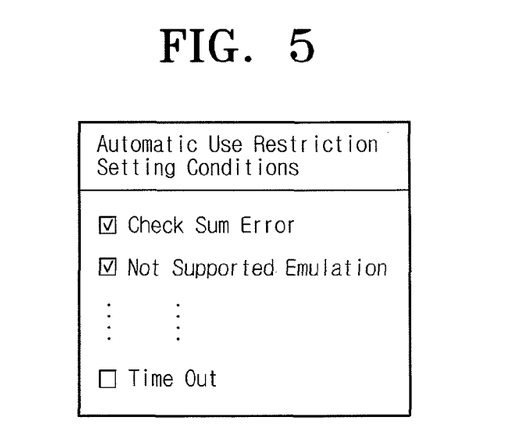
FIG. 5 is a view illustrating an example of a GUI that enables a user to directly set the use restriction conditions of a network printer according to an embodiment of the present general inventive concept.

Along with this, the present general inventive concept can be designed so that a user can directly select conditions to set the use restriction for the first to n-th hosts 200, 200-1, ..., and 200-n as illustrated in FIG. 5. That is, if the user selects desired use restriction setting conditions by manipulating the user manipulation unit 312 through the GUI as illustrated in FIG. 5, the control unit 380 may be used to filter the identification information only when the error corresponding to the selected conditions is detected, and to store the filtered identification information in the storage unit 320. Referring to FIG. 5, the GUI illustrates various "Automatic Use Restriction Setting Conditions" such as the "Check Sum Error" condition which is selected as noted by the corresponding check mark, the "Not Supported Emulation" condition which is also selected as noted by the corresponding check mark, and the "Time Out" condition which is not selected as noted by the absence of a corresponding check mark. Using the GUI of FIG. 5, a user can set which error conditions to set to determine or to detect printing data errors by checking and/or unchecking the corresponding check boxes. Note that FIG. 5 is an illustration and other forms or modifications of the GUI of FIG. 5 may be used.

The GUIs, as illustrated in FIGS. 4 and 5, may be displayed through a web browser of respective hosts 200, 200-1, ..., and 200-n, or on the display panel of FIG. 3 after one of the first to n-th hosts 200, 200-1, ..., and 200-n accesses the network printer 300 by using HTTP, for example.

Figure 6:
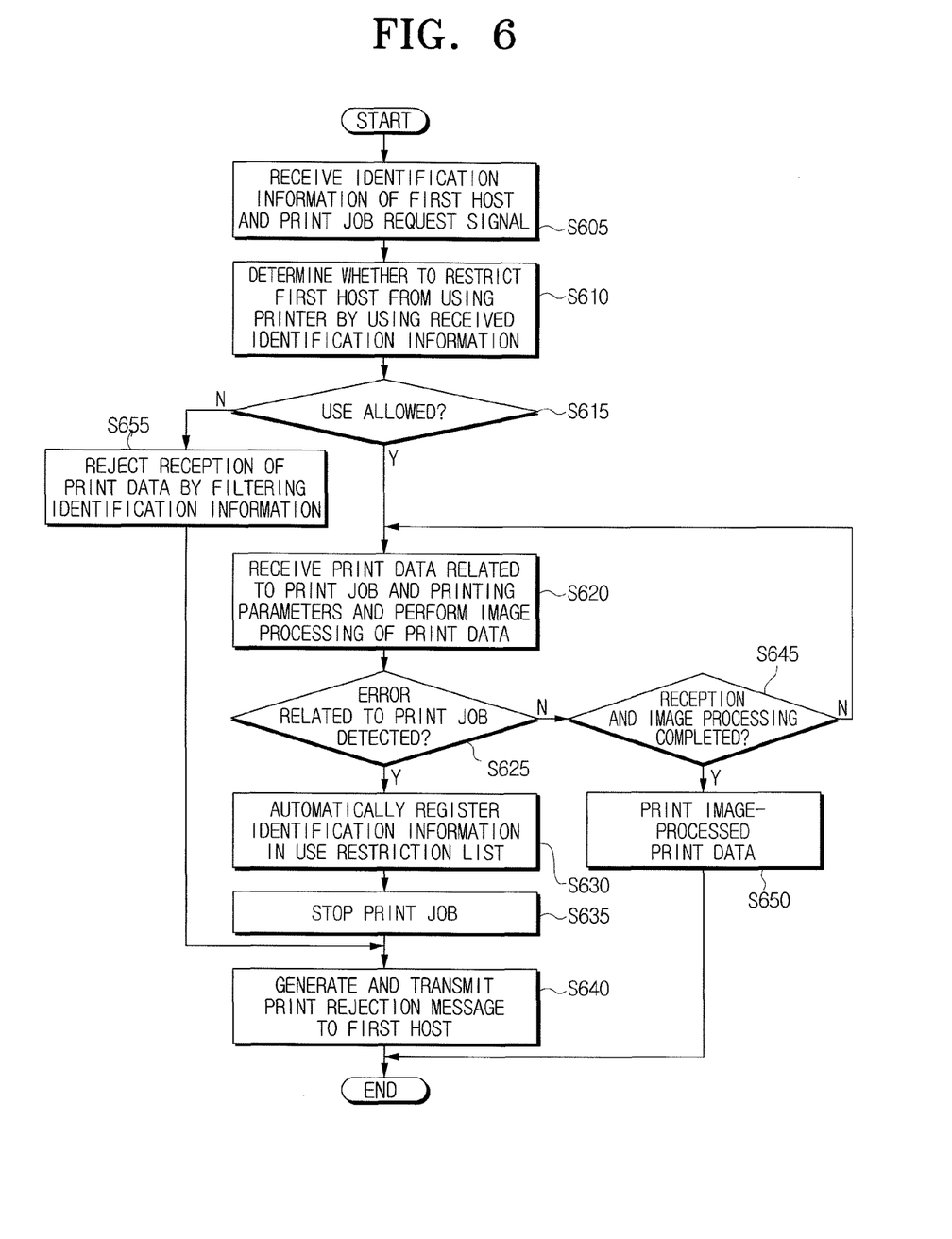
FIG. 6 is a flowchart illustrating a network printing method of restricting a host from using a network printer according to an embodiment of the present general inventive concept.

FIG. 6 is a flowchart illustrating a network printing method to restrict a host from using a network printer according to an embodiment of the present general inventive concept.

Referring to FIGS. 1 to 6, if the device communication unit 330 receives the identification information of the first host 200 and the print job request signal transmitted from the first host 200 through the network 100 at operation (S605), the control unit 380 determines whether the first host 200 has been restricted from using the network printer 300 by using the identification information of the first host 200 at operation (S610). That is, the control unit 380 determines whether to restrict the first host 200 from using the network printer by confirming whether the identification information of the first host 200 has been registered in the use restriction list of the storage unit 320, and temporarily stores the identification information of the first host 200 in a volatile memory such as the RAM 370.

If it is determined that the first host 200 has been allowed to use the network printer 300 at operation (S615), the control unit 380 controls the device communication unit 330 to receive the print data related to the print job and the printing parameters from the first host 200, and controls the image processing unit 340 to perform an image processing of the received print data to match the printing parameters at operation (S620).

If an error related to the print job is detected while the emulator 340a of the image processing unit 340 emulates the print data at operation (S625), the control unit 380 confirms the reason of the error occurrence, and registers (e.g., adds) the confirmed reason for the error occurrence and the temporarily stored identification information into the use restriction list at operation (S630).

Along with this, the control unit 380 stops the operation related to the print job at operation (S635), and controls the image processing unit 340 and the device communication unit 330 to generate and transmit a print rejection message to the first host 200 at operation (S640).

By contrast, if no error related to the print job is detected at operation (S625), then if the reception of the print data and the image processing are completed at operation (S645), the control unit 380 controls the print engine unit 350 to print the image-processed print data to match the printing conditions at operation (S650). However, if the reception of the print data and the image processing are not completed at operation (S645), the process is routed to operation (S620).

On the other hand, if it is determined at operation (S615) that the first host 200 has been restricted from using the network printer 300, the control unit 380 automatically filters the temporarily stored identification information, and controls the device communication unit 330 to reject reception of the print data from the first host 200 at operation (S655). Then, the control unit 380 executes operation (S640).

As described above, in the network printer and the network printing method to restrict a host from using the network printer according to an embodiment of the present general inventive concept, if an error is detected from the print data transmitted from the host, the identification information of the host is automatically filtered and registered in a use restriction list, for example, and thus, the user's inconvenience due to the manual setting of the host's authority to use the network printer can be eliminated.

In addition, in the case where the error containing print job is requested again and again (i.e., repeatedly) by the registered host, the corresponding print job is not executed by an automatic filtering, and thus, the waste of resources due to erroneous printing can be prevented.

In addition, the reason to restrict the host from using the network printer can be provided to the user through the GUI, and thus, the user can identify the printing error more readily, as illustrated in FIG. 5. If the error is identified, the user may be able to take appropriate corrective action to fix or to repair the error.

In addition, the user restriction conditions may be manually selected by the user, and thus it is prevented to register the identification information of the host in the use restriction list whenever the selected error occurs.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A network printing method of restricting a host from using a network printer having a printing engine, the method comprising:
   if identification information of a host and a print job request signal are received from the host, receiving print data from the host and processing the received print data into a printable signal;
   determining whether an error exists in a print job during the processing of the print data into the printable signal by an emulator;
   if the error exists in the print job, determining whether a reason for the error occurrence is comprised in a list of preset use restriction conditions; and
   if it is determined that the reason for the error occurrence is comprised in the list of preset use restriction conditions, automatically registering the reason for the error occurrence and the identification information of the host that sends the print job request including the error in a use restriction list and stopping the print job; and
   if no error exists in the print job, executing the print job with respect to the print data using the printing engine unit.

2. The method of claim 1, further comprising:
   if the print job request signal is received, confirming whether the identification information of the host has been registered in the use restriction list; and
   if the identification information of the host has been registered, rejecting the print data from the host.

3. The method of claim 2, further comprising:
   generating and transmitting a print rejection message to the host if the identification information of the host is registered in the use restriction list.

4. The method of claim 1, further comprising:
   reporting the result of registration to a manager if the identification information of the host has been registered in the use restriction list.

5. The method of claim 1, wherein conditions of determining whether the error exists are set or changed through a user interface.

6. The method of claim 1, wherein the identification information is any one of an IP (Internet Protocol) address and a MAC (Media Access Control) address of the host.

7. A network printer to restrict a host from using the network printer, the network printer comprising:
   a device communication unit to receive identification information of a host, a print job request signal, and print data from the host;
   an image processing unit to process the received print data into a printable signal and determining whether an error exists in a print job during processing of the print data into the printable signal by an emulator;
   a storage unit to register the received identification information of the host in a use restriction list;
   a control unit to determine whether a reason for the error occurrence is comprised in a list of preset use restriction conditions and if it is determined that a reason for the error occurrence is comprised in the list of preset use restriction conditions, to control the storage unit to automatically store a reason for the error occurrence and the identification information of the host that sends the print job request including the error and to stop the print job, if it is determined that the error exists in the print job; and
   a printing engine unit to execute the print job with respect to the print data.

8. The network printer of claim 7, wherein the control unit confirms whether the identification information of the host has been registered in the use restriction list if the print job request signal is received, and controls the device communication unit to reject the print data from the host if the identification information of the host has been registered.

9. The network printer of claim 8, wherein the control unit controls the image processing unit and the device communication unit to generate and transmit a print rejection message to the host if the identification information of the host has been registered in the use restriction list.

10. The network printer of claim 7, wherein the control unit controls the device communication unit to report the result of registration to a manager if the identification information of the host has been registered in the use restriction list.

11. The network printer of claim 7, wherein the identification information is any one of an IP (Internet Protocol) address and a MAC (Media Access Control) address of the host.

* * * * *